United States Patent
Karimidehkordi et al.

(10) Patent No.: US 12,004,224 B2
(45) Date of Patent: Jun. 4, 2024

(54) BEAM FAILURE RECOVERY

(71) Applicant: Nokia Technologies Oy, Espoo (FI)

(72) Inventors: Ali Karimidehkordi, Munich (DE); Samantha Caporal del Barrio, Aalborg (DK); Sami-Jukka Hakola, Kempele (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 17/475,727

(22) Filed: Sep. 15, 2021

(65) Prior Publication Data

US 2023/0084028 A1    Mar. 16, 2023

(51) Int. Cl.
- H04W 4/00     (2018.01)
- H04W 72/044   (2023.01)
- H04W 74/0833  (2024.01)

(52) U.S. Cl.
CPC ..... H04W 74/0833 (2013.01); H04W 72/046 (2013.01)

(58) Field of Classification Search
CPC ............ H04W 74/0833; H04W 72/046; H04B 7/06964
See application file for complete search history.

(56) References Cited

U.S. PATENT DOCUMENTS

| | | | |
|---|---|---|---|
| 10,784,950 B2 | 9/2020 | Kang et al. | |
| 2016/0381715 A1 | 12/2016 | Lee et al. | |
| 2019/0159258 A1* | 5/2019 | Islam | H04L 5/0005 |
| 2019/0254071 A1* | 8/2019 | Park | H04W 74/006 |
| 2020/0351955 A1* | 11/2020 | Jeon | H04W 80/02 |
| 2020/0383167 A1* | 12/2020 | Sengupta | H04W 74/0833 |
| 2021/0014011 A1* | 1/2021 | Xiong | H04W 72/53 |
| 2021/0068160 A1* | 3/2021 | Takahashi | H04W 74/0833 |
| 2021/0144742 A1* | 5/2021 | Jeon | H04L 41/06 |
| 2021/0168858 A1* | 6/2021 | Liu | H04L 27/26 |
| 2021/0243812 A1* | 8/2021 | Agiwal | H04W 74/0833 |
| 2022/0007423 A1* | 1/2022 | Agiwal | H04W 74/0833 |
| 2022/0038935 A1* | 2/2022 | Xiong | H04L 1/08 |
| 2022/0070930 A1* | 3/2022 | Xiong | H04W 56/0045 |
| 2022/0264659 A1* | 8/2022 | Enbuske | H04W 74/002 |
| 2022/0330291 A1* | 10/2022 | Choi | H04W 74/0833 |

(Continued)

FOREIGN PATENT DOCUMENTS

| CN | 112106436 A | * | 12/2020 | .......... H04J 11/0069 |
|---|---|---|---|---|
| CN | 112400355 A | * | 2/2021 | ........... H04L 5/0098 |

(Continued)

OTHER PUBLICATIONS

"3rd Generation Partnership Project; Technical Specification Group Radio Access Network; NR; Physical layer procedures for control (Release 16)", 3GPP TS 38.213, V16.6.0, Jun. 2021, pp. 1-187.

(Continued)

*Primary Examiner* — Thai D Hoang

(74) *Attorney, Agent, or Firm* — Brake Hughes Bellermann LLP

(57) ABSTRACT

There is provided a method comprising: determining channel condition for each of the plurality of beams; selecting, based on the channel conditions, a predetermined number of beams suitable for beam failure recovery; and determining the periodicity preference for each of the predetermined number of beams.

20 Claims, 8 Drawing Sheets

---

500: DETECT AT LEAST ONE BEAM FROM A NETWORK NODE

↓

502: DETERMINE, BASED ON AT LEAST ONE PREDETERMINED CRITERION, A PERIODICITY PREFERENCE OF RANDOM ACCESS OCCASIONS FOR ONE OR MORE OF THE AT LEAST ONE BEAM

↓

504: INDICATE THE ONE OR MORE PERIODICITY PREFERENCES TO THE NETWORK NODE

(56) References Cited

U.S. PATENT DOCUMENTS

| | | | |
|---|---|---|---|
| 2023/0006774 A1* | 1/2023 | Liu | H04L 1/1819 |
| 2023/0045529 A1* | 2/2023 | Khoshkholgh Dashtaki | H04W 72/1268 |
| 2023/0053764 A1* | 2/2023 | Liu | H04L 1/1819 |
| 2023/0077869 A1* | 3/2023 | Ly | H04W 52/0206 370/311 |
| 2023/0084028 A1* | 3/2023 | Karimidehkordi | H04W 72/046 370/216 |

FOREIGN PATENT DOCUMENTS

| | | | |
|---|---|---|---|
| EP | 1611760 A1 | 1/2006 | |
| GB | 2399991 A | 9/2004 | |
| WO | 2004/086797 A1 | 10/2004 | |
| WO | 2020/050957 A1 | 3/2020 | |
| WO | WO-2020067696 A1 * | 4/2020 | H04B 7/06 |
| WO | WO-2021029803 A1 * | 2/2021 | H04B 17/318 |
| WO | WO-2021030804 A1 * | 2/2021 | H04L 1/1671 |
| WO | WO-2021064101 A1 * | 4/2021 | H04W 72/02 |
| WO | WO-2021109140 A1 * | 6/2021 | |
| WO | WO-2021167412 A2 * | 8/2021 | H04L 5/0044 |
| WO | WO-2022015004 A1 * | 1/2022 | |
| WO | WO-2022211388 A1 * | 10/2022 | H04L 5/16 |
| WO | WO-2023014089 A1 * | 2/2023 | H04W 72/0446 |
| WO | WO-2023018122 A1 * | 2/2023 | H04W 74/008 |

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"Considerations on Even Further MIMO Enhancement", 3GPP TSG RAN Rel-18 workshop, RWS-210499, Agenda: 4.1, Apple Inc, Jun. 28-Jul. 2, 2021, 5 pages.

"3rd Generation Partnership Project; Technical Specification Group Radio Access Network; NR; Physical channels and modulation (Release 15)", 3GPP TS 38.211, V15.3.0, Sep. 2018, pp. 1-96.

* cited by examiner

◨ BFR RO FOR CSI-RS BEAM #1

BEAM FAILURE RECOVERY

TECHNICAL FIELD

Various example embodiments relate generally to beam failure recovery.

BACKGROUND

Beam-based communication is one of the key enablers to enhance network capacity, throughput, and reliability. Transmission through directive narrow beams may increase the signal quality at desired user-equipment(s) (UEs), reduces interference over neighbouring nodes, and compensates for additional propagation path-loss due to using higher carrier frequencies (e.g. mm-Wave bands). In order to fully capture beamforming gains, low-latency beam management techniques are essential for initial access, beam tracking, beam/radio link failure recovery and during handover procedures.

SUMMARY OF THE INVENTION

According to a first aspect, there is provided an apparatus, comprising at least one processor and at least one memory including a computer program code, wherein the at least one memory and the computer program code are configured, with the at least one processor, to cause the apparatus to: detect at least one beam from a network node; determine, based on at least one predetermined criterion, a periodicity preference of random access occasions for one or more of the at least one beam; and indicate the one or more periodicity preferences to the network node.

Various embodiments of the first aspect may comprise at least one feature from the following bulleted list:

- wherein the random access occasions are useable for beam failure recovery.
- wherein the one or more periodicity preferences comprise at least a first periodicity preference for at least a first beam and a second periodicity preference for at least a second beam, the first and second periodicity preferences being different.
- wherein there is a default random access occasion periodicity associated with all beams configured for beam failure recovery, and the determined one or more periodicity preferences comprise at least one periodicity preference that is different than the default random access occasion periodicity.
- wherein the at least one predetermined criterion is based on at least one of: signal quality of the corresponding beam, mobility of the apparatus, required service from the apparatus, maximum permissible exposure limit, multi-panel capability.
- receive, from the network node, a configuration for beam failure recovery, wherein the configuration defines random access occasions for at least one beam suitable for beam failure recovery and the configuration is at least partly based on the indicated one or more periodicity preferences; apply, in case of beam failure recovery process, the received configuration.
- when the at least one beam comprises a plurality of beams, determine channel condition for each of the plurality of beams; select, based on the channel conditions, a predetermined number of beams suitable for beam failure recovery; determine the periodicity preference for each of the predetermined number of beams.
- indicate the one or more periodicity preferences by indicating to the network node only one or more beam indices for which the apparatus prefers a different periodicity of random access occasions than a default random access occasion periodicity.
- receive, from the network node, a first configuration for beam failure recovery, wherein the first configuration indicates at least one beam suitable for beam failure recovery and a default random access occasion periodicity for all of the at least one beam indicated in the first configuration; determine the one or more periodicity preferences for one or more of the at least one beam indicated in the first configuration; indicate the one or more periodicity preferences by indicating to the network node one or more beam indices, among the at least one beam indicated in the first configuration, for which the apparatus prefers a different periodicity of random access occasions than the default random access occasion periodicity; receive, from the network node, a second configuration for beam failure recovery, wherein the second configuration indicates the one or more beams suitable for beam failure recovery and wherein the random access occasion periodicity of the one or more beams is at least partly based on the indicated one or more periodicity preferences.
- indicate the one or more periodicity preferences to the network node by indicating the one or more beams to the network node in an order defined by the corresponding one or more periodicity preferences.
- indicate, as an actual value, only the highest or lowest one of the one or more periodicity preferences to the network node.
- when there are predetermined ranges of periodicity preferences, determine one of the predetermined ranges for each of the one or more periodicity preferences; and indicate the one or more periodicity preferences to the network node by indicating the determined one or more periodicity ranges.
- wherein each of the random access occasions is reserved for a contention free random access.

According to a second aspect, there is provided an apparatus, comprising: at least one processor and at least one memory including a computer program code, wherein the at least one memory and the computer program code are configured, with the at least one processor, to cause the apparatus to: receive, from at least one user equipment, information indicating a periodicity preference of random access occasions for at least one beam; determine, at least partly based on the received information, a beam failure recovery configuration for each of the at least one beam, the configuration defining at least random access occasion periodicity for each of the at least one beam; and transmit the at least one beam failure recovery configuration to the at least one user equipment.

Various embodiments of the second aspect may comprise at least one feature from the following bulleted list:

- request the at least one user equipment to provide the information indicating the periodicity preferences.
- wherein the at least one configuration comprises at least a first random access occasion periodicity for at least a first beam and a second random access occasion periodicity for at least a second beam, the first and second periodicities being different.
- receive an indication of a predetermined number of beams suitable for beam failure recovery; determine a set of beams among the predetermined number of beams; determine the beam failure recovery configuration for each beam in the set of beams; transmit to the at least one user equipment information indicating for which beam each configuration is associated with.

indicate to the at least one user equipment a set of periodicity preferences the at least one user equipment is allowed to request.

According to a third aspect, there is provided a method performed by an apparatus, such as a user equipment, the method comprising: detecting at least one beam from a network node; determining, based on at least one predetermined criterion, a periodicity preference of random access occasions for one or more of the at least one beam; and indicating the one or more periodicity preferences to the network node.

Various embodiments of the third aspect may comprise at least one feature from the bulleted list under the first aspect.

According to a fourth aspect, there is provided a method performed by an apparatus, such as a network node, the method comprising: receiving, from at least one user equipment, information indicating a periodicity preference of random access occasions for at least one beam; determining, at least partly based on the received information, a beam failure recovery configuration for each of the at least one beam, the configuration defining at least random access occasion periodicity for each of the at least one beam; and transmitting the at least one beam failure recovery configuration to the at least one user equipment.

Various embodiments of the fourth aspect may comprise at least one feature from the bulleted list under the second aspect.

According to a fifth aspect, there is provided a computer program product embodied on a distribution medium readable by a computer and comprising program instructions which, when loaded into an apparatus, execute the method according to the third aspect.

According to a sixth aspect, there is provided a computer program product embodied on a distribution medium readable by a computer and comprising program instructions which, when loaded into an apparatus, execute the method according to the fourth aspect.

According to a seventh aspect, there is provided a computer program product comprising program instructions which, when loaded into an apparatus, execute the method according to the third aspect.

According to an eight aspect, there is provided a computer program product comprising program instructions which, when loaded into an apparatus, execute the method according to the fourth aspect.

According to a ninth aspect, there is provided an apparatus, comprising means for performing the method according to the third aspect, and/or means configured to cause a user equipment to perform the method according to the third aspect.

According to a tenth aspect, there is provided an apparatus, comprising means for performing the method according to the fourth aspect, and/or means configured to cause a network node to perform the method according to the fourth aspect.

According to an eleventh aspect, there is provided computer system, comprising: one or more processors; at least one data storage, and one or more computer program instructions to be executed by the one or more processors in association with the at least one data storage for carrying out the method according to the third aspect and/or the method according to the fourth aspect.

The embodiments that do not fall under the scope of the claims are to be interpreted as examples useful for understanding the disclosure.

LIST OF THE DRAWINGS

In the following, the invention will be described in greater detail with reference to the embodiments and the accompanying drawings, in which FIG. 1 presents a network, according to an embodiment;

DETAILED DESCRIPTION OF THE INVENTION

Figure 1:
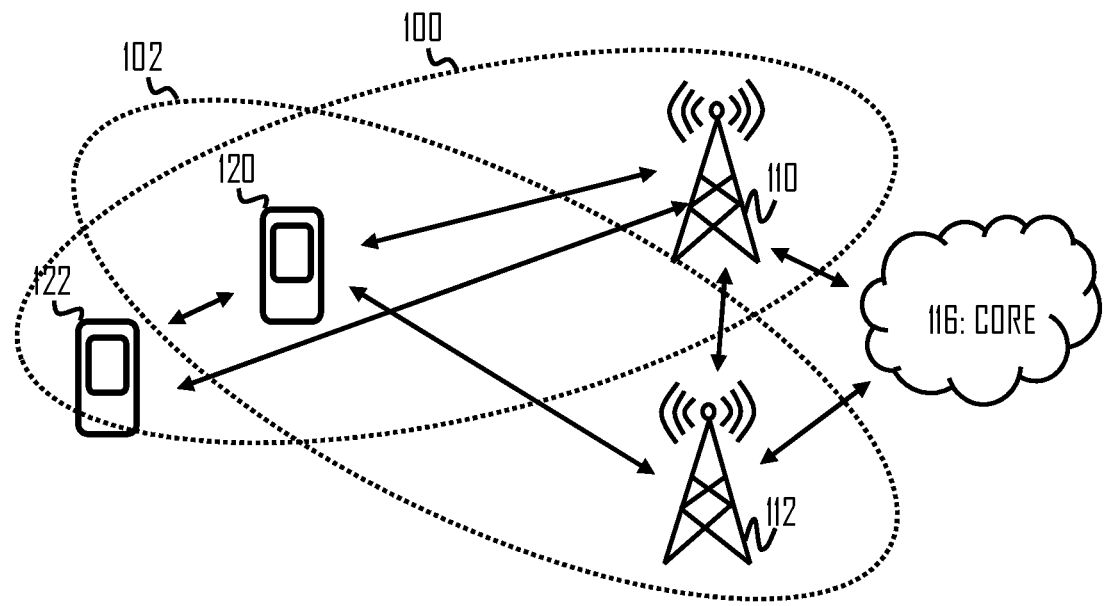

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (H SPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloud-let, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell. The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

When the UE 120 in idle mode wants to establish a connection to the network, the UE needs to acquire frame synchronization information and perform a random access (RA) procedure. For this purpose, the gNB 110 broadcasts a set of wide synchronization signal block (SSB) beams (so called SS burst) in different directions, each carrying dedicated information such as: Primary Synchronization Signal (PSS), Secondary Synchronization Signal (SSS), Physical Broadcast Channel (PBCH), Demodulation Reference Signal (DMRS), etc. Each SS burst has the length of 5 msec and it includes up to 64 SSBs (in FR2). Depending on the network configurations, SS burst has a periodicity between 5 to 160 msec, default being 20 msec. As described in table 1, such information is contained within ServingCellConfigCommon IE that includes cell specific parameters which are broadcasted through System Information Blocks (SIBs).

TABLE 1

| ServingCellConfigCommon information element |  |
|---|---|
| ServingCellConfigCommon ::= | SEQUENCE { |
| physCellId | PhysCellId |
| downlinkConfigCommon | DownlinkConfigCommon |
| uplinkConfigCommon | UplinkConfigCommon |
| supplementaryUplinkConfig | UplinkConfigCommon |
| n-TimingAdvanceOffset | ENUMERATED { n0, n25600, n39936 } |
| ssb-PositionsInBurst | CHOICE { |
|   shortBitmap |   BIT STRING (SIZE (4)), |
|   mediumBitmap |   BIT STRING (SIZE (8)), |
|   longBitmap |   BIT STRING (SIZE (64)) |
| } | |
| ssb-periodicityServingCell | ENUMERATED {ms5, ms10, ms20, ms40, ms80, ms160, spare2, spare1 } |
| dmrs-TypeA-Position | ENUMERATED {pos2, pos3}, |
| lte-CRS-ToMatchAround | SetupRelease {RateMatchPatternLTE-CRS) |
| rateMatchPatternToAddModList | SEQUENCE (SIZE (1..maxNrofRateMatchPatterns)) OF RateMatchPattern |
| rateMatchPatternToReleaseList | SEQUENCE (SIZE (1..maxNrofRateMatchPatterns)) OF RateMatchPatternId |
| ssbSubcarrierSpacing | SubcarrierSpacing |
| tdd-UL-DL-ConfigurationCommon | TDD-UL-DL- |
| ss-PBCH-BlockPower | INTEGER (−60..50), |
| ..., | |
| [[ | |
| channelAccessMode-r16 | CHOICE { |
|   dynamic |   NULL, |
|   semiStatic |   SemiStaticChannelAccessConfig-r16 |
| } | |
| discoveryBurstWindowLength-r16 {ms0dot5,ms1,ms2,ms3,ms4,ms5} | ENUMERATED |
| ssb-PositionQCL-r16 | SSB-PositionQCL-Relation-r16 |
| highSpeedConfig-r16 | HighSpeedConfig-r16 |
| ]] | |
| } | |

The UE 120 may then measure the reference signal received power (RSRP) of the beams in the SS burst, decode cell-specific information and initiate initial access procedure by triggering RA transmission over the best measured SSB beam (or by selecting one the SSBs above an RSRP threshold). The RA preamble transmission may take place over a physical Random Access Occasion (RO) and corresponding Random Access Channel (RACH) configuration, as presented in Table 2. By detecting which random access opportunity the UE 120 is transmitting onto, the network 110 can figure out which SSB Beam the UE 120 has selected, and may then acknowledge a communication link (i.e., by sending Msg2 or MsgB). Random access procedure, either 2-step or 4-step, is assumed to be known to a skilled person and is not explained herein in details.

TABLE 2

RACH-ConfigCommon information element.

```
RACH-ConfigCommon ::=                           SEQUENCE {
    rach-ConfigGeneric                              RACH-ConfigGeneric,
    totalNumberOfRA-Preambles                       INTEGER (1..63)
    ssb-perRACH-OccasionAndCB-PreamblesPerSSB          CHOICE {
        oneEighth                                   ENUMERATED {n4,n8,n12,n16,n20,n24,n28,
                                                        n32,n36,n40,n44,n48,n52,n56,n60,n64},
        oneFourth                                   ENUMERATED {n4,n8,n12,n16,n20,n24,n28,
                                                        n32,n36,n40,n44,n48,n52,n56,n60,n64},
        oneHalf                                     ENUMERATED {n4,n8,n12,n16,n20,n24,n28,
                                                        n32,n36,n40,n44,n48,n52,n56,n60,n64},
        one                                         ENUMERATED {n4,n8,n12,n16,n20,n24,n28,
                                                        n32,n36,n40,n44,n48,n52,n56,n60,n64},
        two                                         ENUMERATED {n4,n8,n12,n16,n20,n24,n28,
                                                        n32},
        four                                        INTEGER (1..16),
        eight                                       INTEGER (1..8),
        sixteen                                     INTEGER (1..4)
    }
    groupBconfigured                                SEQUENCE {
        ra-Msg3SizeGroupA                           ENUMERATED {b56,b144,b208,b256,b282,
                                                        b480,b640,b800,b1000,b72,spare6,
                                                        spare5,spare4,spare3,spare2,spare1},
        messagePowerOffsetGroupB                    ENUMERATED {minusinfinity,dB0,dB5,dB8,
                                                        dB10,dB12,dB15,dB18},
        numberOfRA-PreamblesGroupA                  INTEGER (1..64)
    }
    ra-ContentionResolutionTimer                    ENUMERATED {sf8,sf16,sf24,sf32,sf40,
                                                        sf48,sf56,sf64},
    rsrp-ThresholdSSB                               RSRP-Range
    rsrp-ThresholdSSB-SUL                           RSRP-Range
    prach-RootSequenceIndex                         CHOICE {
        l839                                            INTEGER (0..837),
        l139                                            INTEGER (0..137)
    },
    msg1-SubcarrierSpacing                          SubcarrierSpacing
    restrictedSetConfig                             ENUMERATED {unrestrictedSet,
                                                        restrictedSetTypeA,
                                                        restrictedSetTypeB},
    msg3-transformPrecoder                          ENUMERATED {enabled}
    ...,
    [[
    ra-PrioritizationForAccessIdentity-r16          SEQUENCE {
        ra-Prioritization-r16                           RA-Prioritization,
        ra-PrioritizationForAI-r16                      BIT STRING (SIZE (2))
    }
    prach-RootSequenceIndex-r16                     CHOICE {
        l571                                            INTEGER (0..569),
        l1151                                           INTEGER (0..1149)
    }
    ]]
}
```

Figure 2:
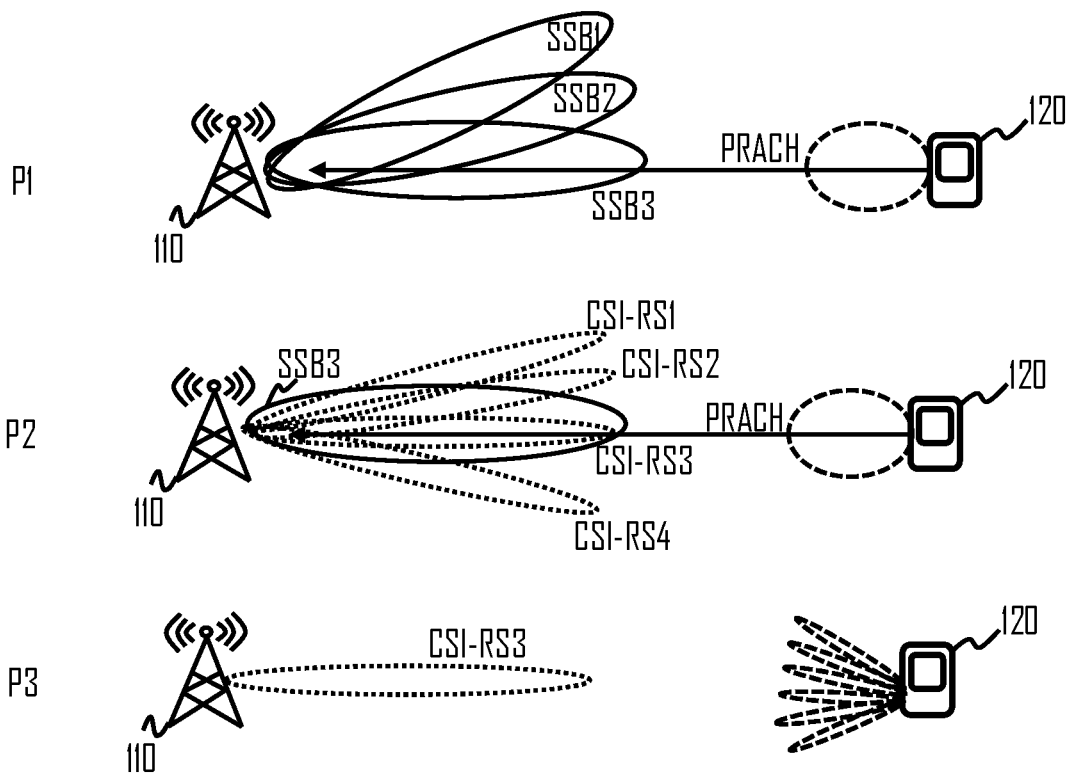
FIG. 2 shows an example of initial access procedure, according to an embodiment.

After successful initial access connection, the UE 120 is RRC_Connected to the gNB 110 through the wide SSB Beam (Phase #1, i.e. P1 of initial access), then the network may try to further boost the throughput by communicating over a narrower beam (Phase #2, i.e. P2 of the initial access). To this end, a set of finer Channel State Information Reference Signal (CSI-RS) beams are configured and transmitted from the gNB 110 within the angular range of the corresponding SSB-Beam. Lastly, the UE 120 may align its narrow beam while the gNB 110 maintains and repeats a fixed CSI-RS (Phase #3, i.e. P3). The described initial access procedure is illustrated in FIG. 2.

In NR, as an example RAT, beam management is a set of Layer 1 (PHY) and Layer 2 (MAC) procedures which mainly rely on measurements of sounding 50 signals i.e. Synchronization Signal Block (SSB) and Channel State Information Reference Signal (CSI-RS) in downlink (DL) and Sounding Reference Signal (SRS) in UL transmission.

Figure 3:
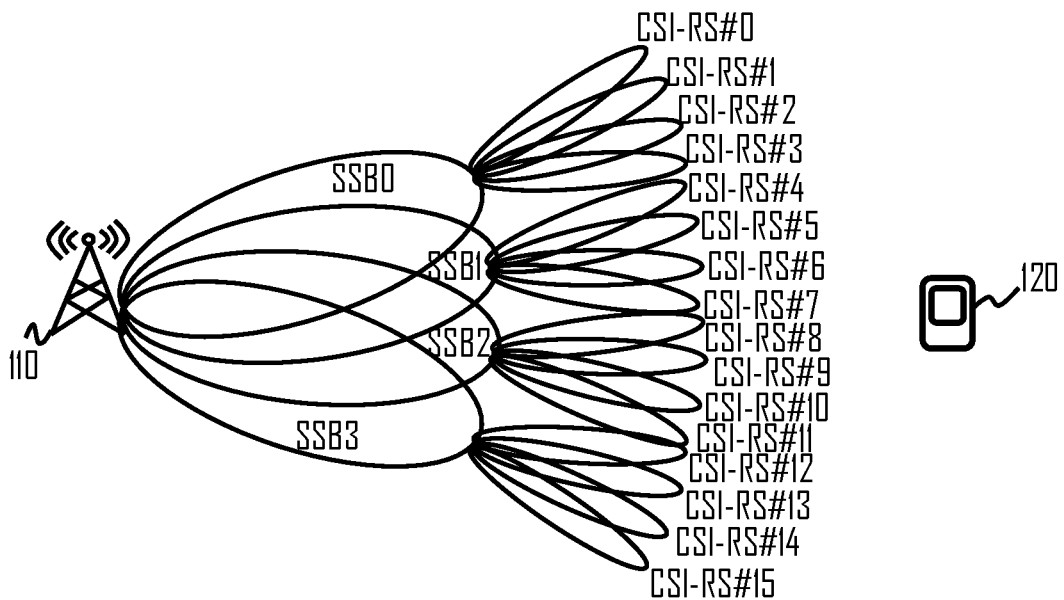
FIG. 3 shows transmission of SSBs and CSI-RS beams, according to an embodiment.

FIG. 3 presents one example of gNB implementation in which the gNB has four wider SSB beams and 16 CSI-RS narrower beams. The UE 120 measures CSI-RS beams and reports a set of N best beams to the network. The network uses the report to configure the UE 120 for beam management (i.e. UL and DL active and configured transmission configuration indication, TCI, states) and for beam failure recovery (BFR).

It may happen that the signal quality of the beam with which the UE 120 is communicating with the gNB 110 decreases. To this end, the UE may provide from L1/PHY out-of-sync (OOS) indications to higher layers. For example, after receiving a beam failure instance indication from PHY layer, the UE 120 starts a beam failure detection timer (beamFailureDetectionTimer) and counts the number of beam failure instances (BFI_COUNTER). The UE declares beam failure and initiates beam failure recovery (BFR) when BFI_COUNTER reaches to a preconfigured beamFailureInstanceMaxCount value while beamFailureDetectionTimer is running.

Beam recovery or a radio link recovery procedure is performed by sending random access preamble through a contention-free (CFRA) resource. The UE 120 can be configured with a candidate list of reference signals (CSI-RS) including a predetermined number of reference signals, e.g. up to 64 RS in Rel.16 (where 48 can be associated with a PRACH preamble). Although 3GPP standard supports configuring the UE with a relatively large number of CSI-RS as CFRA candidate beams, it presents a drawback in resource overhead. Among the configured CFRA resources, the UE attempts BFR on at least one of the physical resources associated to the candidate beams configured for BFR.

As presented in Table 3, BFR related configurations are presented within IE BeamFailureRecoveryConfig. This includes BFR procedure, resources, and parameter settings such as: RA configuration of CFRA occasions for BFR (rach-ConfigBFR), list of candidate reference signals (CSI-RS or SSB) for BFR (candidate-BeamRSList), RO that the UE shall use when performing BFR upon selecting the candidate beam identified by specific CSI-RS beam (ra-OccasionList), RA preamble index to use in the RA occasions associated with a CSI-RS or SSB beam (ra-PreambleIndex), etc. Depending on the network configuration, ROs have a periodicity between 10 to 160 msec.

beams can be shared for initial access and BFR, however the RA occasions (RO) dedicated to CFRA on CSI beams are overhead. CSI-RS RA occasions are mainly configured for beam failure recovery. In time division duplexing (TDD) mode (which is the main operation mode in FR2), the gNB 110 has to configure its ROs to be aligned with the UL slots of its frame structure. In addition to imposed occupied resources of ROs, the gNB 110 reception beam needs to be matched with that configured RO. Therefore, gNBs using analog beamforming (i.e. one gNB active beam at a time) may not be able to schedule other UEs on the rest of the bandwidth, especially in case when there is no ongoing UL transmission with same beam as the RO beam.

In the current 3GPP specification, the gNB 110 determines the periodicity of ROs for BFR without any dynamic or even static feedback from the UE. Higher (e.g. RRC) layer signaling can be used to request L1-measurements on DL RS corresponding to candidate beams (for beam failure recovery), but the reported metric is merely L1-RSRP (or other CSI feedback) and it does not consider any RO periodicity for the candidate beams. Moreover, all the BFR candidate beams may be typically assigned with the same

TABLE 3

BeamFailureRecoveryConfig information element

| | |
|---|---|
| BeamFailureRecoveryConfig ::= | SEQUENCE { |
| rootSequenceIndex-BFR | INTEGER (0..137) |
| rach-ConfigBFR | RACH-ConfigGeneric |
| rsrp-ThresholdSSB | RSRP-Range |
| candidateBeamRSList | SEQUENCE (SIZE (1..maxNrofCandidateBeams)) OF PRACH-ResourceDedicatedBFR |
| ssb-perRACH-Occasion | ENUMERATED {oneEighth,oneFourth,oneHalf, one,two,four,eight,sixteen} |
| ra-ssb-OccasionMaskIndex | INTEGER (0..15 |
| recoverySearchSpaceId | SearchSpaceId |
| ra-Prioritization | RA-PrioritizatioN |
| beamFailureRecoveryTimer | ENUMERATED {ms10,ms20,ms40,ms60,ms80, ms100,ms150,ms200} |
| ..., [[ msg1-SubcarrierSpacing ]], [[ | SubcarrierSpacing |
| ra-PrioritizationTwoStep-r16 | RA-Prioritization |
| candidateBeamRSListExt-v1610 ]], [[ | SetupRelease{CandidateBeamRSListExt-r16} |
| spCell-BFR-CBRA-r16 } | ENUMERATED {true} |
| PRACH-ResourceDedicatedBFR ::= | CHOICE { |
| ssb | BFR-SSB-Resource, |
| csi-RS } | BFR-CSIRS-Resource, |
| BFR-SSB-Resource ::= | SEQUENCE { |
| ssb | SSB-Index, |
| ra-PreambleIndex ... } | INTEGER (0..63), |
| BFR-CSIRS-Resource ::= | SEQUENCE { |
| csi-RS | NZP-CSI-RS-ResourceId, |
| ra-OccasionList | SEQUENCE (SIZE(1..maxRA-OccasionsPerCSIRS)) OF INTEGER (0..maxRA-Occasions-1) |
| ra-PreambleIndex ... } | INTEGER (0..63) |

Figure 4:
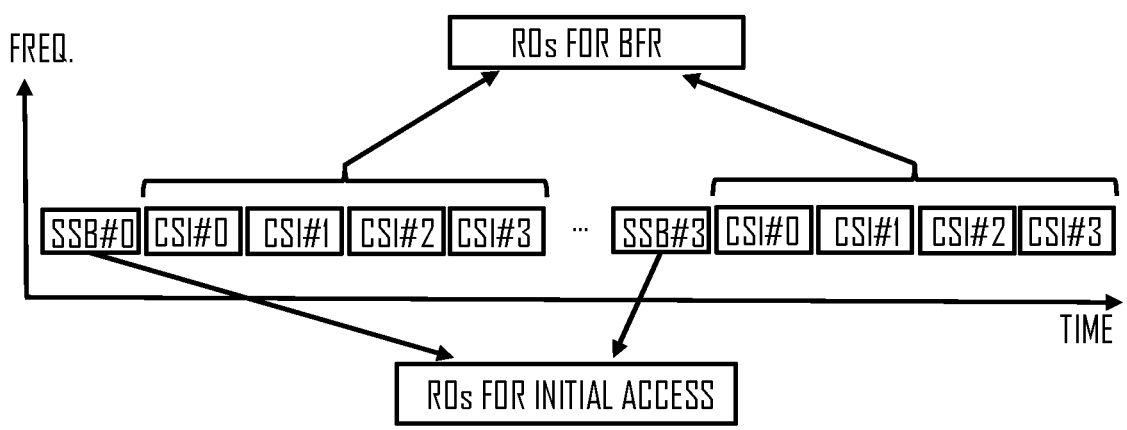
FIG. 4 illustrates distribution of random access occasions, according to an embodiment.

As indicated above, currently there seems to be vast amount of resources spent for the allocation of RACH opportunities on CSI-RS beams for CFRA BFR. This presents a problem e.g. for Rel-18 multi-beam enhancements. FIG. 4 presents one periodicity of RA occasions for the described example configuration of Table 3 (assuming msg1-FDM=1). It can be seen that the RA occasions on SSB RA periodicity. On one hand, lower periodicity of ROs comes with additional resource usage and may not be efficient for the network capacity and throughput. On the other hand, longer periodicities impose additional delays during BFR and may interrupt service continuity and latency requirements of different applications. The gNB 110 does not have knowledge from the UE 120 to adapt the periodicity of the RO per beam. Nonetheless, based on conditions such as channel variations, mobility, channel prediction, service requirement and maximum permissible exposure (MPE), the UE 120 may require different periodicities (i.e. a periodicity preference) of CSI-RS ROs so that it can perform BFR on one (some) specific CSI-RS beam(s) more frequently than the other ones.

As such, there is a need to optimize the gNB's decision mechanism on the periodicity of CSI-RS ROs for BFR. As will be explained below, this may take place by utilizing UE's feedback on the preferred periodicity of at least one CSI-RS candidate beam for recovery. As such, one aim of the proposal may be to improve the network capacity by reducing the overhead and resource usage of unnecessary CSI-RS BFR occasions (e.g. BFR ROs), and also to improve the UE experienced BFR performance by well-timed assignment of BFR ROs.

Figure 5:
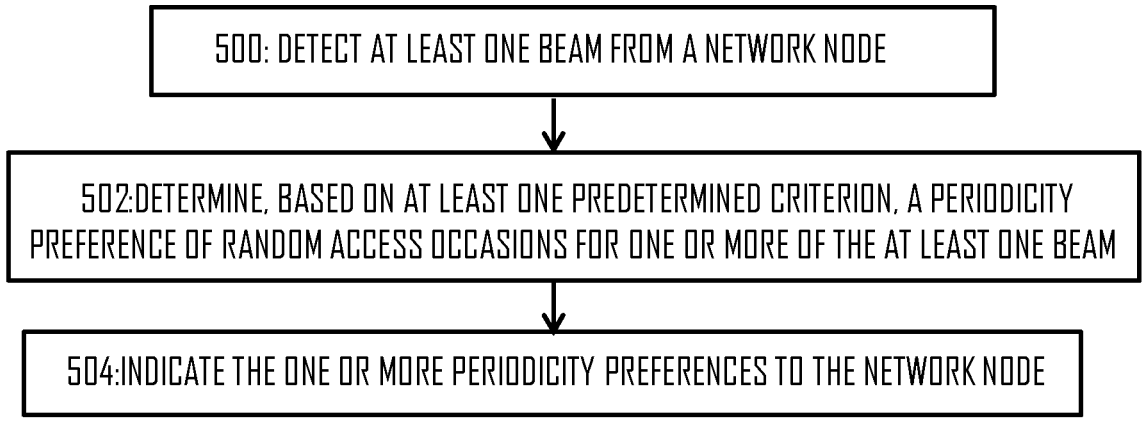
FIGS. 5 and 6 show methods, according to some embodiments.

FIG. 5 depicts an example method. The method may be performed by a user equipment, such as the UE 120. As shown in FIG. 5, the UE 120 in step 500 detects at least one beam from a network node. The network node may be e.g. the gNB 110. In another embodiment, the network node may be a mobile relay or another UE. In this application the term "beam" denotes transmission with a reference signal, e.g. SSB or CSI, and/or gNB Tx spatial filtering. That is, the detected beam(s) may be SSB beam(s) or CSI-RS beam(s), for example. The detection of a beam may be based on e.g. RSRP of the beam and an RSRP threshold value, for example.

In step 502, the UE 120 determines, based on at least one predetermined criterion, a periodicity preference of random access occasions for one or more of the at least one beam. In other words, there may be one beam detected and the periodicity preference is determined for that beam, or there may be many beams detected and the periodicity preference is determined for one, many, or all of those detected beams. The determined periodicity preference may be the same for many beams, or it may be different for different beams or for different groups of beams (and same within a group of beams).

In step 504, the UE 120 indicates the one or more periodicity preferences to the network node 110. The indication is to be understood broadly to cover e.g. indicating the exact periodicity preference values, or some other type of indication, such as indicating the CSI-RS/beam indexes so that the gNB understands (based on predetermined rule) that these indicated beams are to be associated with more or less frequent ROs, as explained in more details later. In some examples the indicated (preferred) periodicity value may have granularity i.e. an index value may express a specific value range (e.g. bits '01' may indicate periodicity range between 10-20 ms and '11' indicate <10 ms etc.). Some non-limiting options for indicating the preferred RO periodicity to the network node 110 include: by indicating percentage of all resources in the relevant beam that should contain an RO, by using a configuration index of Table 6.3.3.2-4: "Random access configurations for FR2 and unpaired spectrum" in 3GPP TS 38.211 v15.3.0, by using an index of the Table 6.3.3.2-4, or of a newly defined table for this purpose, by using a bit combination for a corresponding LCID, for example. The indication may be sent as MAC or RRC signaling to the network node 110, e.g. over the current serving beam.

In an embodiment, the ROs are useable for beam failure recovery (BFR). In an embodiment, the ROs are useable only for BFR.

The UE 120 may determine and indicate the periodicity preference(s) before BFR takes place, i.e. proactively.

In an embodiment, each of the ROs is reserved for a contention free random access (CFRA). This type of CFRA utilizes reserved preambles for a contention free access, and its success rate is typically better than contention based random access (CBRA). In one embodiment, however, the ROs also comprise ROs utilizing CBRA, or all ROs are reserved for CBRA.

In an embodiment, the one or more periodicity preferences comprise at least a first periodicity preference for at least a first beam and a second periodicity preference for at least a second beam, the first and second periodicity preferences being different. In this scenario is it assumed that the UE 120 has detected more than one beam in step 500. Then the UE 120 may in step 502 determine different periodicity preferences for the beams and indicate those to the network.

In one embodiment, the at least one beam for which the first and second periodicity preferences are determined comprises a first and a second group of beams. The beams may be grouped by the UE 120 so that those one or more beams for which the periodicity preference is the same are grouped together.

In one embodiment, there is a default RO periodicity associated with all beams configured for beam failure recovery, and the determined one or more periodicity preferences comprise at least one periodicity preference that is different than the default RO periodicity. In other words, the periodicity preference is aiming at changing the RO periodicity of at least one beam. In case there is no need to change the periodicity preference of any detected beams, then the UE 120 may restrain from indicating the periodicity preferences to the network.

Let us take a look at the proposal from the point of view of the network node, such as the gNB 110. In step 600, the gNB 110 receives, from at least one UE 120, information indicating one or more periodicity preferences of ROs for at least one beam. In step 602, the gNB 110 determines, at least partly based on the received information, a BFR configuration for each of the at least one beam, the configuration defining at least RO periodicity for each of the at least one beam. In step 604, the gNB 110 transmits the at least one BFR configuration to the at least one UE 120.

In an embodiment, the UE 120 may then receive, from the network node 110, the configuration for BFR (i.e. BFR configuration), wherein the configuration defines ROs for at least one beam suitable for BFR and the configuration is at least partly based on the indicated one or more periodicity preferences. For example, the RO periodicity of at least one beam of the configuration is determined by the gNB 110 at least partially on the basis of the indicated periodicity preferences. The UE may then apply, in case of BF, the received configuration to perform BFR.

Figure 7A:
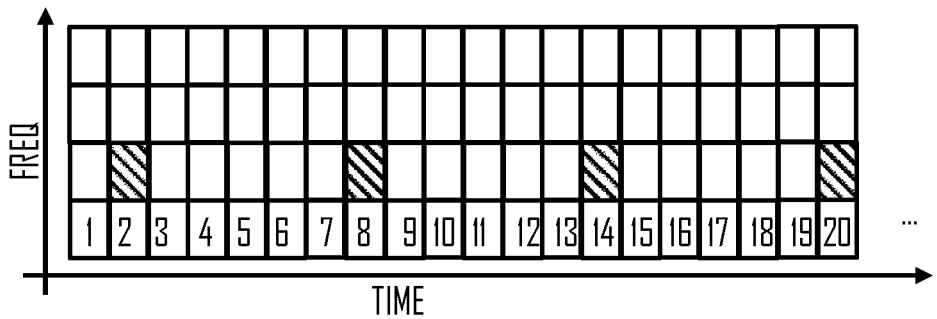
FIG. 7 illustrate different distributions of random access occasions in a given beam, according to an embodiment.
Figure 7B:
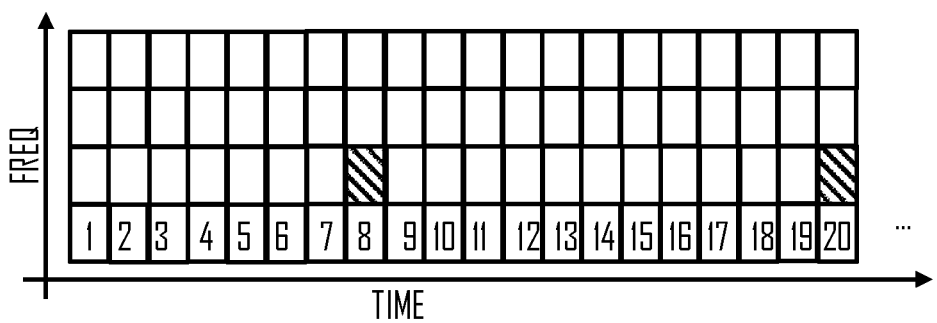
Figure 7C:
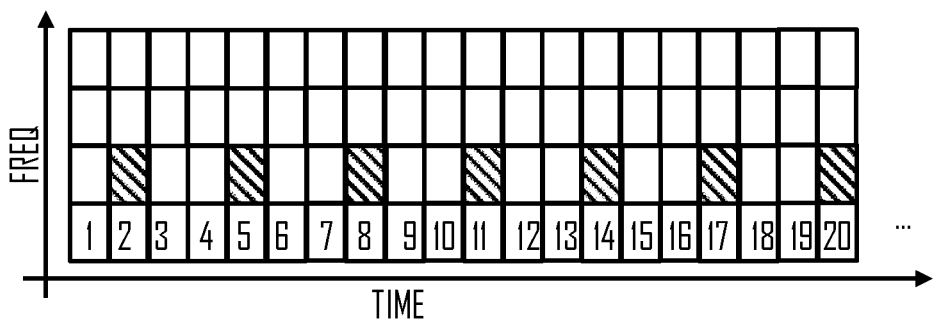

FIG. 7 shows how the periodicity preference may impact the RO periodicity of one beam. In FIG. 7A, it is shown that the ROs of a given CSI-RS beam may have a certain (e.g. default, based on standard specification, etc.) periodicity. Those time-frequency resources that are marked in left leaning diagonal lines are in this example reserved for CFRA UL PRACH occasions. After the UE 120 has indicate the periodicity preference to the gNB 110 transmitting the beam, the gNB 110 may change the RO periodicity according to UE's needs. In FIG. 7B, it is shown that the gNB 110 has decreased the periodicity for BFR ROs. Thus, an updated PRACH occasions configuration for CSI-RS beam #1 may be set up after the gNB has received from the UE the preferred periodicity reporting, In FIG. 7C, the gNB 110 has increased the periodicity for BFR ROs. In this case, re-configured/updated PRACH occasions for CSI-RS beam #1 may be set up after the gNB has received from the UE the preferred periodicity reporting. These shown decrement and increment of RO periodicities are merely non-limiting examples and other (e.g. more or less frequent) ROs are possible. The other time-frequency resources in the CSI-RS beam #1 ((i.e. blocks in FIG. 7) may be reserved for other UL signaling or for DL signaling.

Although not shown, it is possible that the gNB 110 rejects the periodicity suggestion from the UE. This may be due to resource management. for example, when the UE 120 asks for increased periodicity, the gNB 110 may not allow this if the resources asked by the UE are already reserved for other purposes. In such case, the gNB 110 may reply with NACK to the periodicity preference message, in which case the UE reverts back to normal default periodicity. Alternatively, the UE 120 may maintain the earlier BFR configuration for as long as a new configuration is received. If the gNB 110 cannot/will not accept the requested periodicity, the gNB 110 may restrain form sending an updated BFR configuration, or send one with previous RO periodicity values, for example.

Figure 8:
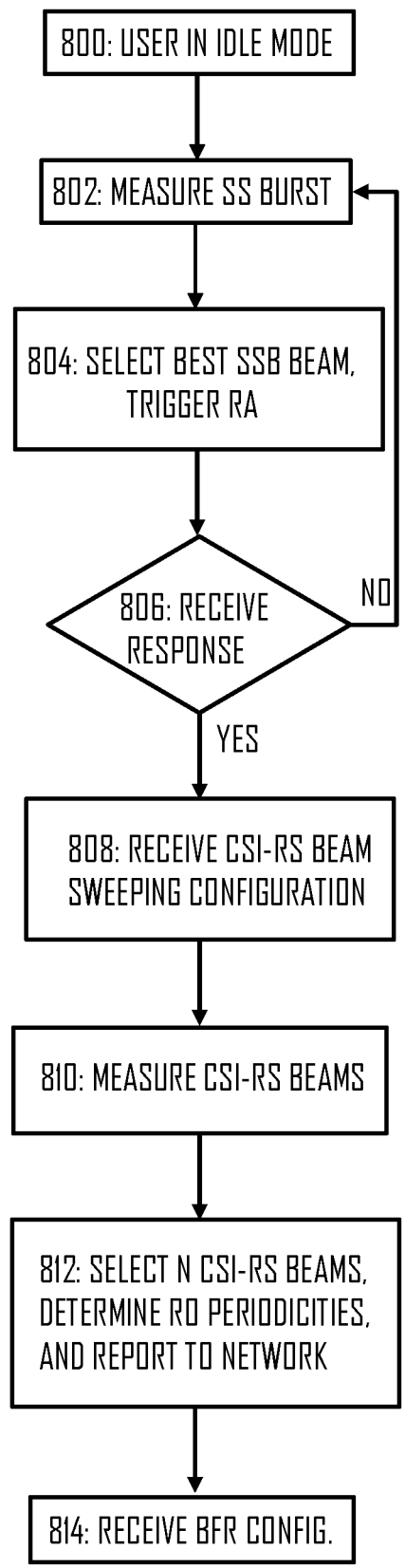
FIGS. 8 and 9 show signaling flow diagrams, according to some embodiments.

Let us now take a look at a flowchart diagram illustrating the operation of the UE from idle mode to connected mode until the reception of the (new) BFR configuration. In step 800 of FIG. 8, the UE is in idle mode. In step 802, the UE measures SS burst from the gNB 110. In step 804, the UE selects beast SSB and triggers random access. In case the UE 120 receives in step 806 a response to the random access preamble sent in step 804, the UE proceeds to step 808. In case no response is received, the UE goes back to step 802.

In step 808, the UE receives CSI-RS beam sweeping configuration. As shown in FIG. 2 (step P2) this may comprise plurality of CSI-RS beams which the UE may measure in step 810. In step 812, the UE may select a number (N) beast beams, determine the RO periodicity preferences for the N beams, and report/indicate those to the network. As a response to this, the UE may in step 814 receive BFR configuration which may be at least partly based on the reported RO periodicity preferences. The UE may then start/continue communication with the network (e.g. the gNB 110). If a beam failure occurs, the UE may apply the received BFR configuration for performing BFR over one of the N beams.

Figure 9:
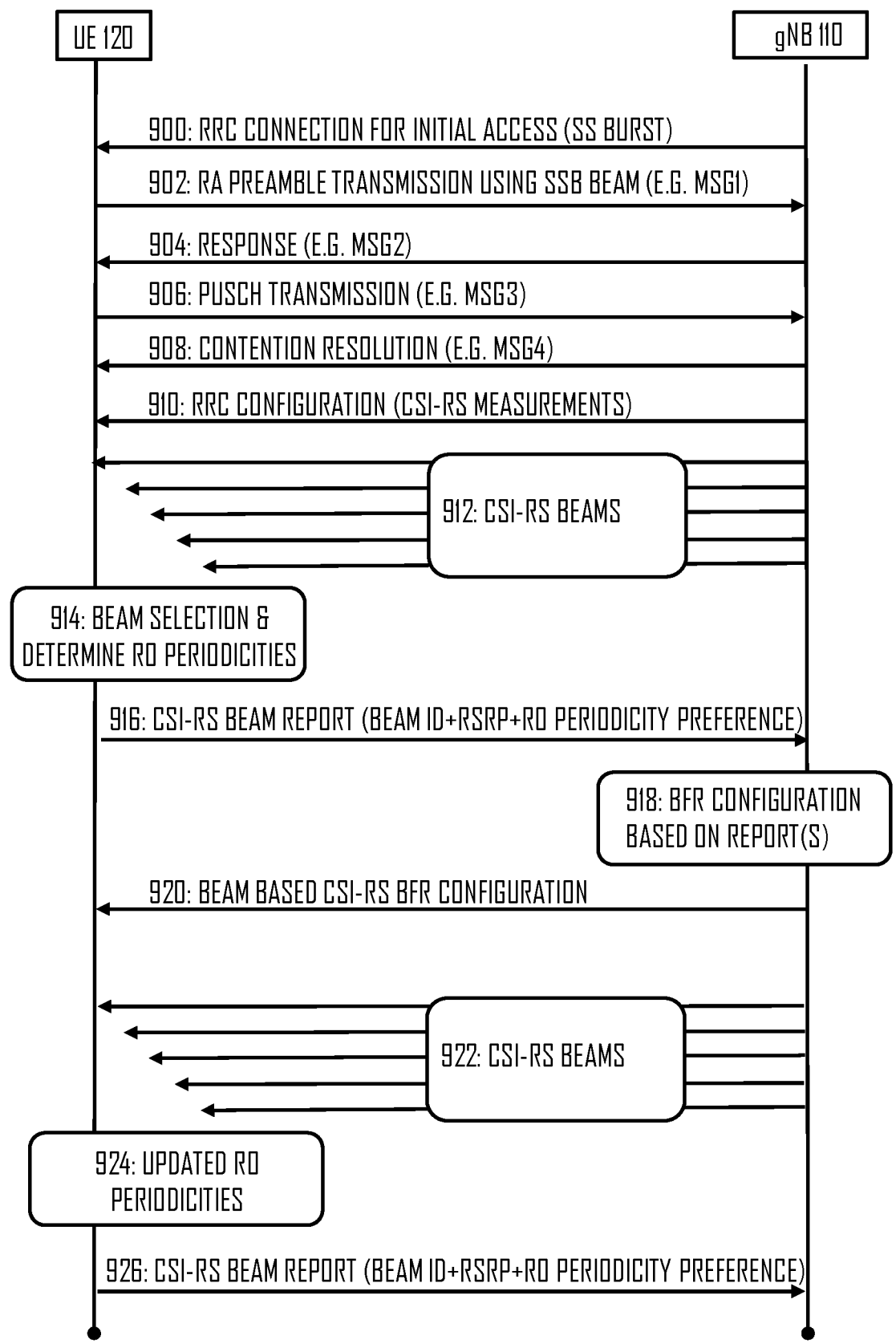

FIG. 9 shows a signaling flow diagram between a user equipment, such as the UE 120, and a network node, such as the gNB 110. In step 900 the gNB 110 periodically transmits a set of SS burst including parameters for initial access. In step 902, the UE measures SSBs, and selects one with the highest received RSRP (or other predetermined measure, such as, SINR) and triggers RA transmission. This may comprise transmitting a CBRA preamble to the gNB 110. In step 904, RA Response (Msg2) takes place. There the gNB 110 transmits RA response (RAR) that carries e.g. (i) ID of successfully received preambles, (ii) Temporary Cell Radio Network Temporary Identifier (C-RNTI), (iii) PUSCH uplink grants for Msg3, etc. In step 906 the UE 120 performs PUSCH transmission (Msg3), where the UE applies timing advance (TA) and transmits the data to gNB 110 using the PUSCH resources. The MAC PDU in PUSCH contains UE ID, etc. In step 908, contention resolution (Msg4) is performed such that the gNB 110 responds to the received Msg3 with contention resolution message that contains the UE ID which was successfully received in Msg3. Instead of the prescribed 4-step RACH, a 2-step RACH may be performed.

In step 910, the UE 120 receives an RRC Configuration indicating CSI-RS measurement configuration. This may comprise the gNB 110 configuring the UE 120 with CSI-RS beam sweeping parameters and corresponding resources for measurement reporting. In step 912, the gNB 110 transmits a set of CSI-RS beams within the angular of the SSB beam used for above described random access operation.

In step 914, the UE 120 detects the CSI-RS beams from the gNB 110. This step may be, in an embodiment, seen as being comprised in step 500 of FIG. 5. As shown, in an embodiment, there are a plurality of beams detected. Instead of determining the RO periodicity preference for each detected beam, the UE 120 may first determine channel condition, such as RSRP or other predetermined metric, for each of the plurality of detected beams. Then the UE 120 may select, based on the channel conditions, a predetermined number N of beams to be reported to the network. These N beams may comprise beams suitable for BFR (suitable because of sufficiently high signal quality). In case one or more beams of the plurality of detected beams are not useable for BFR for any reason, the beam may not be selected. The UE then determines the periodicity preference for each of the N beams. This step may be, in an embodiment, seen as being comprised in step 502 of FIG. 5.

The determination of the RO periodicity preferences is based on at least one predetermined criterion. In an embodiment, the at least one predetermined criterion comprises at least one of: signal quality (e.g. estimated variation thereof) of the corresponding beam, mobility of the apparatus, required service from the apparatus, maximum permissible exposure limit, multi-panel capability. Any combination of the above criterion may be used in determining the RO periodicities.

For example, in an embodiment, if the UE 120 experiences high channel variations (in RSRP, SNR, SINR, etc.), this may imply that a higher periodicity of RO is needed in at least one beam, to combat fading and misalignment which may be particularly challenging for narrow beams such as CSI-RS beams. The variation may be determined based on monitoring the signal quality for a predetermined du-ration. The expected variation may also take mobility (speed, direction, rotation) of the UE into account. In an embodiment, variation of power delay profile (PDP) between consecutive measurement/instances, possibly within a preconfigured threshold/range, may be used to estimate the signal quality variation, For example, when the PDP varies within the preconfigured threshold, it may be estimated that the signal quality variation is/will be small. On the other hand, when the PDP varies outside the range, it may be estimated that the signal quality variation is/will be high.

In an embodiment, each beam's signal variation affects that beam's RO periodicity. However, in an embodiment, serving beam's variation increases the risk of BF in general, so in such case at least one of the BFR candidate beams N should have a high periodicity to reduce recovery latency.

As another example, the UE 120 may in an embodiment estimate its service requirement in terms of reliability, latency, and service continuity. In case the UE 120 requires high reliability and/or low latency for its service, a higher RO periodicity may be requested. Channel measurements may also impact UE's determination on requesting higher or lower periodicities of BFR ROs in at least one beam.

Figure 10:
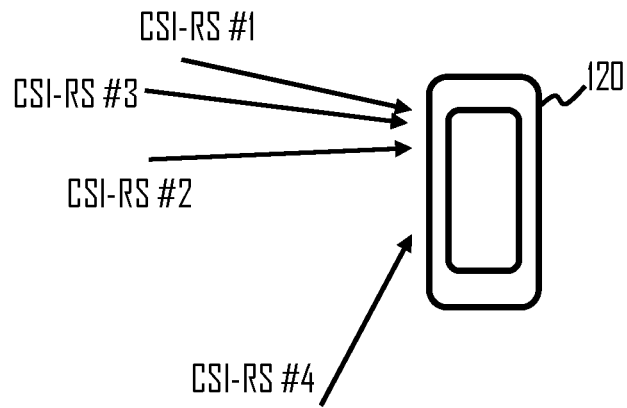
FIGS. 10 and 11 show different criteria for determining random access occasion periodicity preferences, according to some embodiment.

FIG. 10 presents yet one example for determining the RO periodicity preference(s). In this example, the UE measures three CSI-RS beams with similar angle of arrival (e.g. with same panel or with adjacent panels) indicating that they are coming from the same path. Therefore, a potential blockage may block all the three beams. In this case, the UE may prefer to have lower periodicity of ROs for beams #1, 2, and 3. Or as an alternative a higher RO periodicity for one of the beam (e.g. beam #1) and a lower RO periodicity from the other ones coming from similar directions (e.g. beams #2, 3). The RO periodicity for beam #4 may be higher, as it is from another direction and may thus be useable for BFR in case beams #1-#3 are in blockage.

In an embodiment, intra-cell mobility prediction (e.g. for factory automation) may affect the R periodicity determination. E.g. the UE 120 may predict the beam which will provide better quality during movement. This may take place so that when the angle of arrival of a given beam is determined to be from the direction where the UE is moving, it may be expected that this beam may provide good signal quality and thus may be a BFR candidate beam. Hence, the UE 120 may decide to request higher periodicity of ROs for this beam. Lower RO periodicities may be requested for beams that probably will not provide good signal quality anymore after movement of the UE 120.

In an embodiment where the UE 120 is rotating, the UE may request higher RO periodicity for a beam which the UE 120 measures with relatively good quality with all antenna panels, in order to increase robustness. Whether the quality, e.g. RSRP, is good may be based on predetermined threshold or the beam's quality may be compared to other beams quality.

Figure 11:
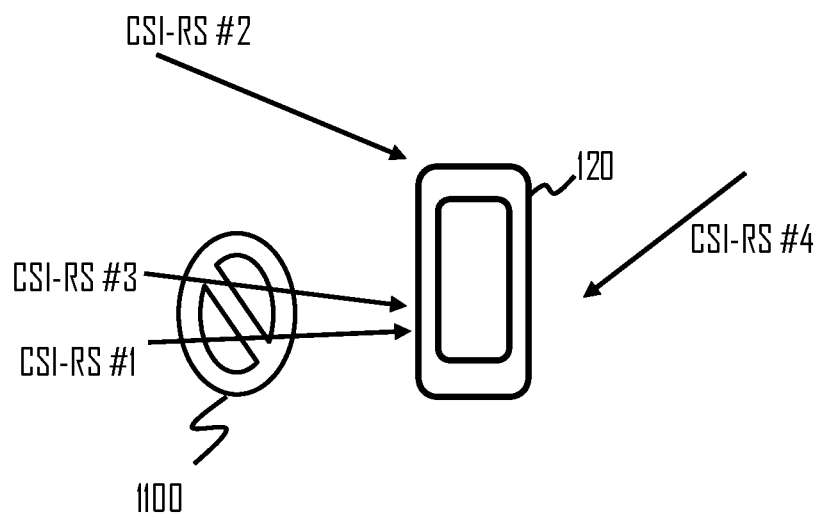

One embodiment, shown in FIG. 11, presents a scenario with MPE where the UE 120 detects that a hand or another blockage 1100 is approaching toward its serving panel (beam). Presence of the hand may act as blockage for the serving beam (e.g. beam CSI-RS #3). Also, the UE 120 may need to perform a power back-off to comply with MPE regulations. In this scenario and when BFR occurs, it may be beneficial for the UE 120 to switch its serving beam to another panel (e.g. beam #2). Thus, the UE 120 may prefer to have higher periodicity of ROs e.g. from beam #2 or #4, and lower RO periodicities from beams #1 and #3.

Let us then look further in FIG. 9. In step 916, the UE 120 may then indicate the RO periodicity preference(s) to the network node 110. This may correspond to step 504 of FIG. 5. Although not shown, the gNB 110 may request the at least one UE to provide the information indicating one or more periodicity preferences. In another embodiment, the UE(s) are configured to do e.g. based on standard specifications.

In the report, the UE 120 may report to the network at least one of the following for each reported beam: the selected CSI-RS beam index, corresponding measured quantity (e.g., RSRP), preferred BFR RO periodicity. This information can be transmitted in several ways.

In an embodiment, the UE reports a desired RO periodicity for each detected beam or for each reported beam. This embodiment may provide detailed information for each beam and thus provides for accuracy.

In an embodiment, the desired periodicity may be an actual RO periodicity preference value for each reported beam, or one actual RO periodicity value for each of at least one group of beams, in case the UE groups the beams based on RO periodicity preferences.

In an embodiment, the UE 120 may indicate the one or more periodicity preferences by indicating to the network node only one or more beam indices for which the apparatus prefers a different periodicity of random access occasions than a default random access occasion periodicity. There may be a predefined rule according to which the gNB 110 interprets the reported beams, i.e. so that each reported beam is to be associated with an increased RO periodicity, for example.

The UE 120 may be configured to provide L1 report on CSI-RS resource/SSB (e.g. beam) indices, e.g. up to N resources, for which UE prefers to have increased RO periodicity. In a further example embodiment, the UE may be configured to select the resources/beams that have the L1-RSRP (or other channel state information, CSI, quantity) above the quality threshold and for which UE prefers the increased periodicity. In another example, UE may be configured to only report a request for preferred periodicity for (up to N) resources that have L1-RSRP above the threshold. In an embodiment the UE reports N beams, but in another IE the UE provides only the indexes of the beams for which the UE desires increased or decreased RO periodicity, for example. In one example, the preferred periodicity indication via L1-RSRP reporting may reuse the format of L1-RSRP report. It may also have a reporting format where only a resource index value(s) are provided (as there is a condition for L1-RSRP threshold). In some examples the report may be a MAC layer report (MAC CE).

In another embodiment network may configure restriction for the periodicity value that UE can request. In an example, the network may indicate to the UE candidate periodicity values that the network node can support. In a case where UE would request a periodicity value that is lower than the lowest candidate periodicity value, the UE is configured to not indicate any RO periodicity preference value. In another example, the UE may then select the lowest candidate periodicity value among the candidate periodicity values provided by the network node. Similar solution may be used for a case where the UE would otherwise report a RO periodicity preference higher than the highest candidate periodicity value.

In one embodiment, which has low overhead, the UE 120 indicates the one or more periodicity preferences to the network node 110 by indicating the one or more beams to the network node 110 in an order defined by the corresponding one or more periodicity preferences. In other words, the RO information can be implicitly transferred to the network node 110 by using the order of CSI-RS beams in the beam report. For example, beams with highest required RO priorities can be placed at the beginning of the CSI report while beam with the lowest RO priorities could be located at the end of CSI-report, or vice versa. The gNB 110 may be configured to interpret the CSI-RS beam report correspondingly. This option imposes no additional overhead.

However, from the beam report positions the network can only know the order of the required periodicities and not the actual values. One option to over-come this issue is to indicate, as an actual value, only the highest or lowest one of the one or more periodicity preferences. This way the network may know the highest or lowest periodicity value for one of the beams and may then, based on predetermined rule, decrease or increase the RO periodicities for each beam in the order of the report.

As said, in an embodiment, the desired periodicity may be an actual RO periodicity preference value for each reported beam, or one actual RO periodicity value for each of at least one group of beams. However, in another embodiment, there are predetermined ranges of periodicity preferences. In such case, the UE 120 may determine one of the predetermined ranges (e.g. low, normal, high, very high) for each of the one or more periodicity preferences, and indicate the one or more periodicity preferences to the network node by indicating the one or more periodicity ranges for each of the reported beams.

In an embodiment, the gNB 110 configures the UE to send periodicity information as a multi-bit medium access control (MAC) control element (CE) in the UL. In this case, a bitmap table may be developed which represents desired periodicity to corresponding bit sequences. Table 4 describes a two-bit mapping example of such MAC CE. It is noted that the numerical values and bit combinations in the tables are merely examples.

TABLE 4

Bitmap example for MAC-CE indicating requested periodicity for a given CSI-RS beam.

| Periodicity bits | Periodicity status |
| --- | --- |
| 00 | Low; (every 160 msec) |
| 01 | Normal; (every 40, 80) msec |
| 10 | High; (every 20 msec) |
| 11 | Very high; (every 10 msec) |

This bit combination can be then transmitted as multi-entry or single-entry periodicity report using one of the reserved MAC-CE logical channel ID (LCIDs) indexes in the UL. Table 5 presents example values of LCIDs for UL shared channel.

TABLE 5

Values of LCID for UL-SCH

| Codepoint/Index | LCID values |
| --- | --- |
| 0 | CCCH of size 64 bits (referred to as "CCCH1" in TS38.331 [5]) |
| 1-32 | Identity of the logical channel |
| 33 | Extended logical channel ID field (two-octed eLCID field) |
| 34 | Extended logical channel ID field (one-octed eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_1$) |
| 51 | Truncated FR (one octet $C_1$) |
| 52 | CCCH of size 48 bits (referred to as "CCCH" in TS38.331 [5]) |
| 53 | Recommended bit rate query |
| 54 | Multiple Entry PHR (four octets $C_1$) |
| 55 | Configured Grant Confirmation |
| 56 | Multiple Entry PHR (one octet $C_1$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

In another embodiment, the gNB 110 may configure the UE 120 to send the RO periodicity preference information as one of CSI report quantities. Table 6 presents example quantity options for a CSI report. To support the reporting, one new report configuration entry with RO periodicity information may be added to the Table.

TABLE 6

CSI report quantity configuration

| reportQuantity | CHOICE { |
| --- | --- |
| none | NULL, |
| cri-RI-PMI-CQI | NULL, |
| cri-RI-i1 | NULL, |
| cri-RI-i1-CQI | |
| pdsch-BundleSizeForCSI | SEQUENCE { |
| }, | ENUMERATED {n2, n4} |
| cri-RI-CQI | NULL, |
| cri-RSRP | NULL, |
| ssb-Index-RSRP | NULL, |
| cri-RI-LI-PMI-CQI | NULL |
| }, | |

In an embodiment, the UE 120 receives, from the network node 110, a first configuration for BFR, wherein the first configuration indicates at least one beam suitable for BFR and a default RO occasion periodicity for all of the at least one beam indicated in the first configuration. Then, the UE 120 may, based on signal qualities for example, select one or more beams from the at least one configured beam. the UE may select all or only a subset of the configured BFR beams.

Then, the UE 120 may determine the one or more periodicity preferences for the one or more of the at least one beam indicated in the first configuration. This may take place based on the at least one predetermined criterion described above. In this way, the UE may be configured with a specific measurement configuration where UE determines the reported CSI-RS beam indices based on previously configured BFR beams for CFRA recovery.

The UE 120 may then indicate the one or more periodicity preferences to the network node 110 by indicating one or more beam indices, among the at least one beam indicated in the first configuration, for which the apparatus prefers a different periodicity of RO occasions than the default RO occasion periodicity. There may be a predefined rule according to which the gNB 110 interprets the reported beams, i.e. so that each reported beam is to be associated with an RO periodicity which is increased or decreased by a predetermined amount compared to the default RO periodicity, for example.

Each CSI-RS beam may be referred with an index and the UE 120 may be configured to report up to N CSI-RS beams above the RSRP threshold, or alternatively up to N resources that have RSRP above the threshold and for which UE prefers the increased or decreased RO periodicity. E.g. the report may contain the CSI-RS beam indexes for which higher RO periodicity is required. Optionally the UE may also report the required RO periodicity value for each concerned CSI-RS beam.

As a response to this, the UE 120 may receive, from the network node 110, a second configuration for BFR, wherein the second configuration indicates the one or more beams suitable for BFR and wherein the RO occasion periodicity of the one or more beams is at least partly based on the indicated one or more periodicity preferences.

Let us then continue with FIG. 9. In step 918, the gNB 110 receives the RO periodicity preference report from the UE, and possibly from one or more other UEs. Based on the provided feedbacks/reports from different users, the network node 110 configures the UE(s) with beam-based CSI-BFR RO. The BFR Configuration provided in step 920 may include parameters, such as candidate-BeamRSList and RACHConfig. These may comprise e.g. for each CSI-RS beam a Preamble-Index and CSI-RS RA-Occasion List.

In one embodiment, the network node 110 configures different periodicities of RO for different recovery beams based on the indications/report from one or more UEs (including UE 120).

In an embodiment, in response to the UE's L1-RSRP report about best N beams, the UE 120 may receive a response from the gNB 110 where the gNB 110 provides an association between CFRA resources and DL beams for M reported beams, where M<=N. That is, after receiving an indication of the predetermined number N of beams suitable for beam failure recovery, the gNB 110 may determine a set of beams among the N beams. The set of M beams may comprise all N beams, or be as subset of the N beams. The value for M is thus between 1 and N. Value for M could be fixed, semi-statically configured (RRC) or provided in the response (allowing dynamic behaviour). The gNB 110 may then determine BFR configuration (including information of the ROs) for each of the set of M beams, and transmit to the at least one UE information indicating the configuration and for which beam each configuration is associated with. Such response from the gNB 110 to the UE 120 may directly associate the reported M CSI-RS beams to certain CFRA resources. The response could be provided either in MAC CE or DCI. With such a mechanism the gNB 110 can provide dynamically the UE 120 with M BFR beams that are reflecting the strong candidate BFR beams but are not the selected beam(s) for the downlink or uplink transmissions.

In an embodiment, the N reported beams from the UE 120 can be grouped according to RO periodicity requirement. For example, a subset (M) of beams (N) is associated with a first RO periodicity and the rest (N-M) of the N beams are associated with a second RO occasion periodicity, the first and second periodicities being different.

In step 922 of FIG. 9, the UE may at some point later in time remeasure the set of CSI-RS beams. The transmission of these can be aperiodic, semi-periodic, or periodic. In step 924, The UE 120 may update the measurement report and preferred periodicities based on the measured CSI-RS beams, possibly using the knowledge of previous BFR configuration(s). For example, the measured resources are determined by the UE implicitly based on the configured BFR resource list. When candidate beam list is updated, the UE 120 may update the measurement configuration for RO periodicity preference reporting. In step 926, the UE 120 may send the updated beam report (similar to step 916) to the network node 110, which may in turn update the BFR configuration for the UE based on the UE report.

The above described embodiments allow the UE to measure CSI-RS beams, determine the required periodicity for each CSI-RS to be reported for BFR, and reports them to the network as part of e.g. L1 reporting or MAC-CE. Based on the provided reports from the different one or more UE(s), the network node may configure BFR beams and corresponding parameters (including RO periodicities) for each beam and transmit BFR configurations to the UEs.

In one embodiment, the gNB receives a plurality of RO periodicity preferences from several UEs for the same beam. In such case, the gNB may take all of the requests into account, and determine the RO periodicity of that beam to be the average of the RO periodicity requests from the UEs, or to correspond to the highest requested periodicity, as a few non-liming examples.

One advantage of the proposed embodiments may include improved latency of beam failure recovery mechanism with optimized resource allocation and reduced service interruption time, i.e. time for re-establishing a successful connection to the gNB. The proposed invention may optimize BFR procedure by assigning BFR ROs based on the preferred beam and required periodicity which help in reducing latency in BFR and increases the BFR success rate probability, and by optimizes network resource consumption by avoiding unnecessary allocation of ROs for BFR.

Figure 12:
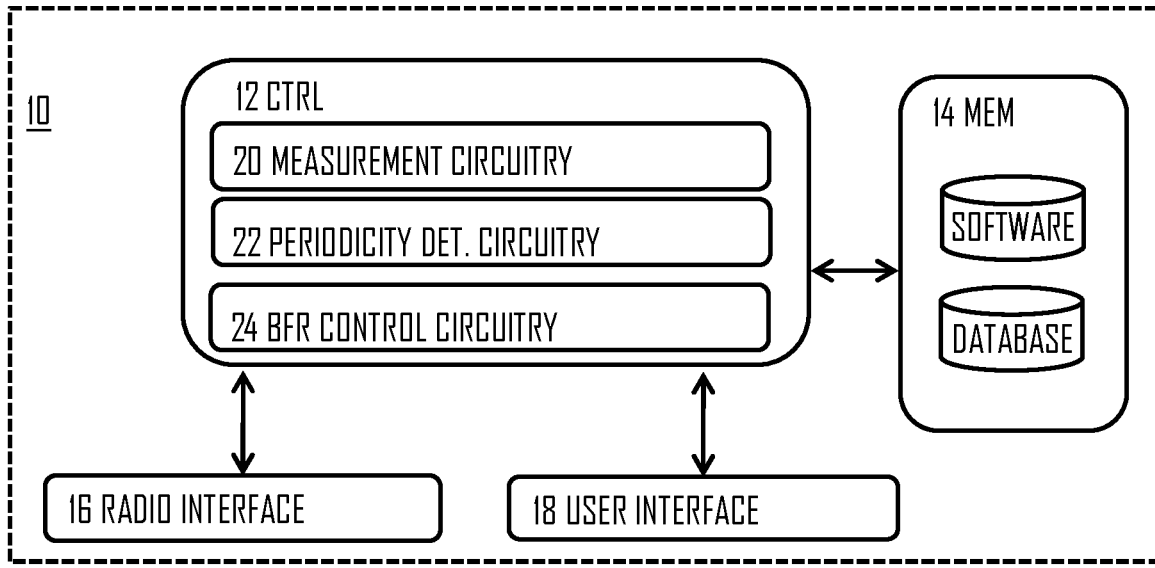
FIGS. 12 and 13 illustrate apparatuses, according to some embodiments.

An embodiment, as shown in FIG. 12, provides an apparatus 10 comprising a control circuitry (CTRL) 12, such as at least one processor, and at least one memory 14 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute some of the functionalities of the above described processes, such as the steps of FIG. 5.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise a signal measurement circuitry for measuring the radio signal qualities of different beams, according to any of the embodiments. The control circuitry 12 may further comprise a periodicity determination circuitry 22 for determining the periodicities for different beams, according to any of the embodiments. The control circuitry 12 may further comprise a BFR control circuitry 24 for performing BFR procedure upon detecting beam failure. The BFR procedure may be then based on BFR configuration which is at least partially based on the determined and reported RO periodicity preferences.

Figure 6:
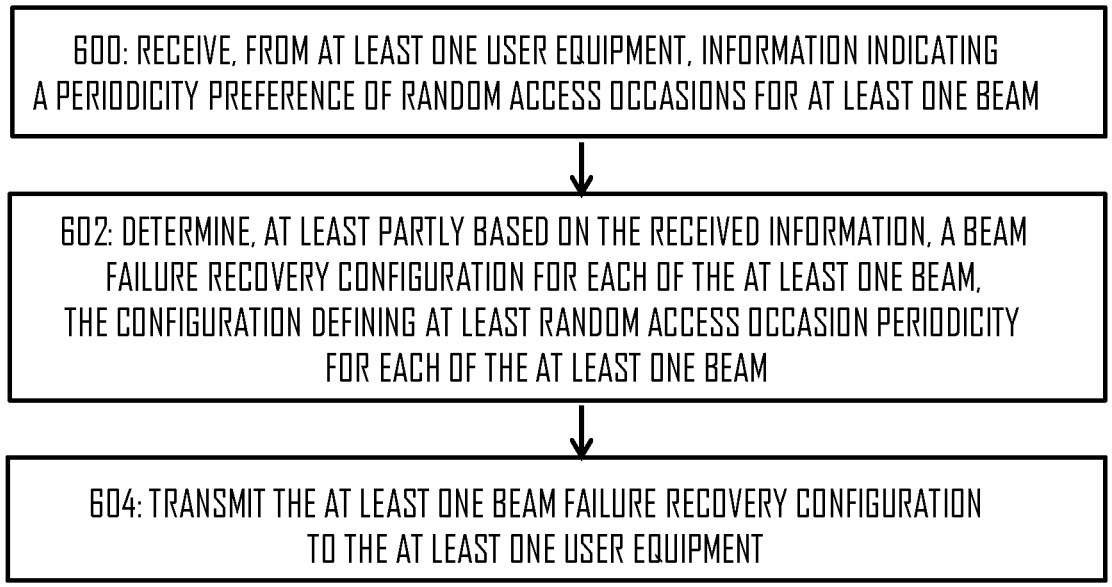
Figure 13:
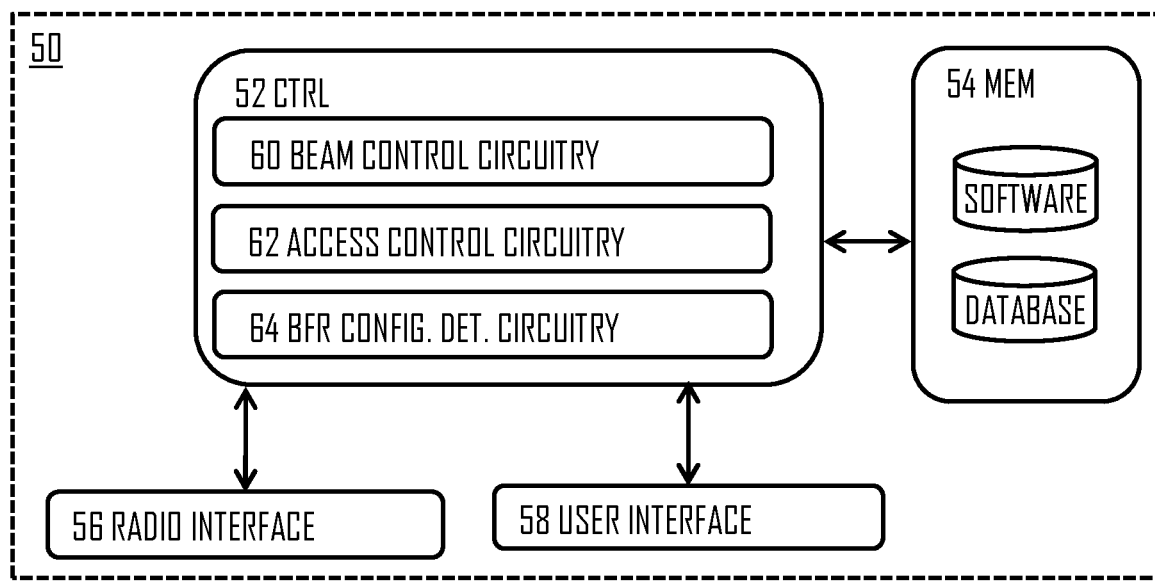

An embodiment, as shown in FIG. 13, provides an apparatus 50 comprising a control circuitry (CTRL) 52, such as at least one processor, and at least one memory 54 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data In an embodiment, the apparatus 50 may be or be comprised in a network node, such as in gNB/gNB-CU/gNB-DU of 5G. In an embodiment, the apparatus is or is comprised in the network node 110. The apparatus may be caused to execute some of the functionalities of the above described processes, such as the steps of FIG. 6.

In an embodiment, a CU-DU (central unit-distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be standalone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access net-work, for example. The apparatus may also comprise a user interface 58 comprising, for example, at least one keypad, a microphone, a touch display, a display, a speaker, etc. The user interface may be used to control the apparatus by the user.

The control circuitry 52 may comprise a beam control circuitry 60 for determining which beams are to be transmitted to the UE(s), according to any of the embodiments. The control circuitry 52 may comprise an access control circuitry 62 e.g. for responding to the UE 120 when the UE attempts connection with the network. The control circuitry 52 may comprise an BFR configuration determination circuitry 64, e.g. for determining the BFR configuration based on the reports from the UE(s), according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

Terminology "means for [performing A, B, C]", is to be interpreted to cover an apparatus in which there is only one means for performing A, B and C, or where there are separate means for performing A, B and C, or partially or fully overlapping means for performing A, B, C. Further, terminology "means for performing A, means for performing B, means for performing C" is to be interpreted to cover an apparatus in which there is only one means for performing A, B and C, or where there are separate means for performing A, B and C, or partially or fully overlapping means for performing A, B, C.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured, with the at least one processor, to cause the apparatus to:
detect at least one beam from a network node;
determine, based on at least one predetermined criterion, a periodicity preference of random access occasions for one or more beams of the at least one beam; and
indicate the periodicity preference of random access occasions for the one or more beams to the network node.

2. The apparatus of claim 1, wherein the random access occasions are useable for beam failure recovery.

3. The apparatus of claim 1, wherein the periodicity preference of random access occasions for the one or more beams comprise at least a first periodicity preference for at least a first beam and a second periodicity preference for at least a second beam, the first and second periodicity preferences being different.

4. The apparatus of claim 1, wherein there is a default random access occasion periodicity associated with all beams configured for beam failure recovery, and the determined periodicity preference of random access occasions for the one or more beams comprise at least one periodicity preference that is different than the default random access occasion periodicity.

5. The apparatus of claim 1, wherein the at least one predetermined criterion is based on at least one of: signal quality of the corresponding beam, mobility of the apparatus, required service from the apparatus, maximum permissible exposure limit, or multi-panel capability.

6. The apparatus of claim 1, wherein the at least one memory and the computer program code are configured, with the at least one processor, to cause the apparatus further to:
receive, from the network node, a configuration for beam failure recovery, wherein the configuration defines random access occasions for at least one beam suitable for beam failure recovery and the configuration is at least partly based on the indicated periodicity preference of random access occasions for the one or more beams; and
apply, in case of beam failure recovery process, the received configuration.

7. The apparatus of claim 1, wherein the at least one beam comprises a plurality of beams, and the at least one memory and the computer program code are configured, with the at least one processor, to cause the apparatus further to:
determine channel condition for each of the plurality of beams;
select, based on the channel conditions, a predetermined number of beams suitable for beam failure recovery; and
determine the periodicity preference for each of the selected predetermined number of beams.

8. The apparatus of claim 1, wherein the at least one memory and the computer program code are configured, with the at least one processor, to cause the apparatus further to:
indicate the periodicity preference of random access occasions for the one or more beams by indicating to the network node only one or more beam indices for which the apparatus prefers a different periodicity of random access occasions than a default random access occasion periodicity.

9. The apparatus of claim 1, wherein the at least one memory and the computer program code are configured, with the at least one processor, to cause the apparatus further to:
receive, from the network node, a first configuration for beam failure recovery, wherein the first configuration indicates at least one beam suitable for beam failure recovery and a default random access occasion periodicity for all of the at least one beam indicated in the first configuration;
determine the periodicity preference of random access occasions for the one or more beams indicated in the first configuration;
indicate the periodicity preference of random access occasions for the one or more beams by indicating to the network node one or more beam indices, among the at least one beam indicated in the first configuration, for which the apparatus prefers a different periodicity of random access occasions than the default random access occasion periodicity; and receive, from the network node, a second configuration for beam failure recovery, wherein the second configuration indicates the one or more beams suitable for beam failure recovery and wherein the random access occasion periodicity of the one or more beams is at least partly based on the indicated periodicity preference of random access occasions for the one or more beams.

10. The apparatus of claim 1, wherein the at least one memory and the computer program code are configured, with the at least one processor, to cause the apparatus further to:

indicate the periodicity preference of random access occasions for the one or more beams to the network node by indicating the one or more beams to the network node in an order defined by the corresponding periodicity preference of random access occasions for the one or more beams.

11. The apparatus of claim 10, wherein the at least one memory and the computer program code are configured, with the at least one processor, to cause the apparatus further to:

indicate, as an actual value, only the highest or lowest one of the periodicity preference of random access occasions for the one or more beams to the network node.

12. The apparatus of claim 1, wherein there are predetermined ranges of periodicity preferences, and the at least one memory and the computer program code are configured, with the at least one processor, to cause the apparatus further to:

determine one of the predetermined ranges for each of the periodicity preference of random access occasions for the one or more beams; and indicate the periodicity preference of random access occasions for the one or more beams to the network node by indicating the determined one or more periodicity ranges.

13. The apparatus of claim 1, wherein each of the random access occasions is reserved for a contention free random access.

14. The apparatus of claim 1, wherein the apparatus is or is comprised in a user equipment and the apparatus is operating according to New Radio.

15. An apparatus, comprising:

at least one processor and at least one memory including a computer program code, wherein the at least one memory and the computer program code are configured, with the at least one processor, to cause the apparatus to:

receive, from at least one user equipment, information indicating a periodicity preference of random access occasions for at least one beam;

determine, at least partly based on the received information, a beam failure recovery configuration for each of the at least one beam, the configuration defining at least random access occasion periodicity for each of the at least one beam; and transmit the at least one beam failure recovery configuration to the at least one user equipment.

16. The apparatus of claim 15, wherein the at least one memory and the computer program code are configured, with the at least one processor, to cause the apparatus further to:

request the at least one user equipment to provide the information indicating the periodicity preference of random access occasions for at least one beam.

17. The apparatus of claim 15, wherein the at least one configuration comprises at least a first random access occasion periodicity for at least a first beam and a second random access occasion periodicity for at least a second beam, the first and second periodicities being different.

18. The apparatus of claim 15, wherein the at least one memory and the computer program code are configured, with the at least one processor, to cause the apparatus further to:

receive an indication of a predetermined number of beams suitable for beam failure recovery;

determine a set of beams among the predetermined number of beams;

determine the beam failure recovery configuration for each beam in the set of beams; and transmit to the at least one user equipment information indicating which beam each configuration is associated with.

19. The apparatus of claim 15, wherein the at least one memory and the computer program code are configured, with the at least one processor, to cause the apparatus further to:

indicate to the at least one user equipment a set of periodicity preferences the at least one user equipment is allowed to request.

20. A method, comprising:

detecting at least one beam from a network node;

determining, based on at least one predetermined criterion, a periodicity preference of random access occasions for one or more beams of the at least one beam; and indicating the periodicity preference of random access occasions for the one more beams to the network node.

* * * * *